United States Patent
Kakuta

(10) Patent No.: US 10,477,066 B2
(45) Date of Patent: Nov. 12, 2019

(54) IMAGE PROCESSING APPARATUS TO EXTRACT LUMINANCE DATA FROM IMAGE DATA, METHOD FOR CONTROLLING THE SAME, AND STORAGE MEDIUM

(71) Applicant: CANON KABUSHIKI KAISHA, Tokyo (JP)

(72) Inventor: Hitoshi Kakuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/660,583

(22) Filed: Jul. 26, 2017

(65) Prior Publication Data

US 2018/0041660 A1    Feb. 8, 2018

(30) Foreign Application Priority Data

Aug. 2, 2016    (JP) .................................. 2016-152290

(51) Int. Cl.
| | |
|---|---|
| H04N 1/40 | (2006.01) |
| H04N 1/405 | (2006.01) |
| G06F 3/12 | (2006.01) |
| H04N 1/60 | (2006.01) |
| H04N 1/62 | (2006.01) |

(52) U.S. Cl.
CPC ......... *H04N 1/4055* (2013.01); *G06F 3/1203* (2013.01); *G06F 3/1248* (2013.01); *G06F 3/1284* (2013.01); *H04N 1/6008* (2013.01); *H04N 1/626* (2013.01); *H04N 2201/0082* (2013.01)

(58) Field of Classification Search
CPC combination set(s) only.
See application file for complete search history.

(56) References Cited

U.S. PATENT DOCUMENTS

| 8,873,108 B2 * | 10/2014 | Sasaki ................. H04N 1/4072 358/1.9 |
| 2009/0196524 A1 * | 8/2009 | Godin ..................... G06T 5/004 382/263 |

FOREIGN PATENT DOCUMENTS

JP    2015079443 A    4/2015

* cited by examiner

*Primary Examiner* — Barbara D Reinier
(74) *Attorney, Agent, or Firm* — Canon U.S.A., Inc. I.P. Division

(57) ABSTRACT

There are provided an image processing apparatus and a control method for controlling the image processing apparatus. The control method includes extracting a high-luminance region including a high-luminance pixel having a higher luminance than a predetermined luminance included in received image data, expanding the high-luminance region by setting pixel values of pixels configuring a surrounding region of the high-luminance region determined based on an area of the high-luminance region to the same pixel value as the high-luminance pixel, and outputting image data having the expanded high-luminance region.

12 Claims, 7 Drawing Sheets

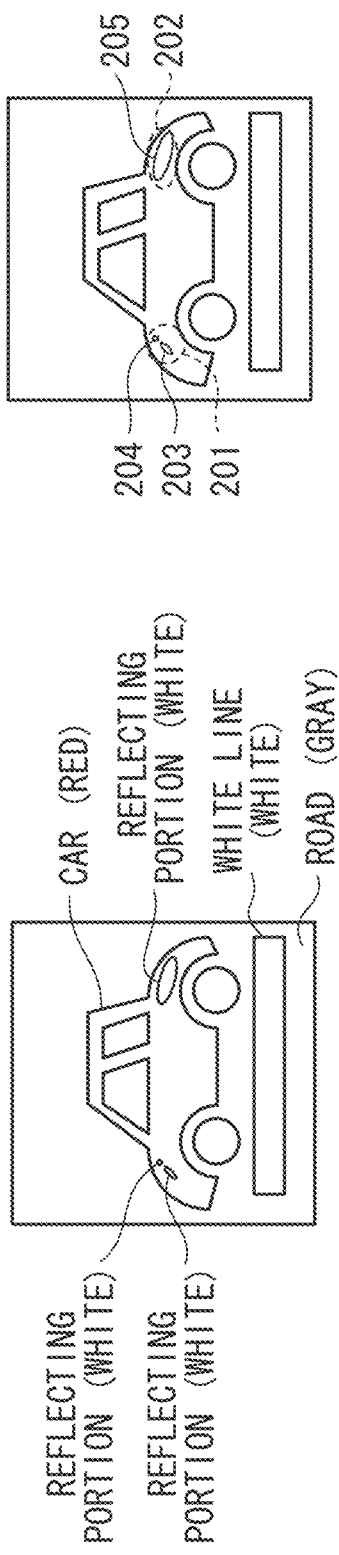
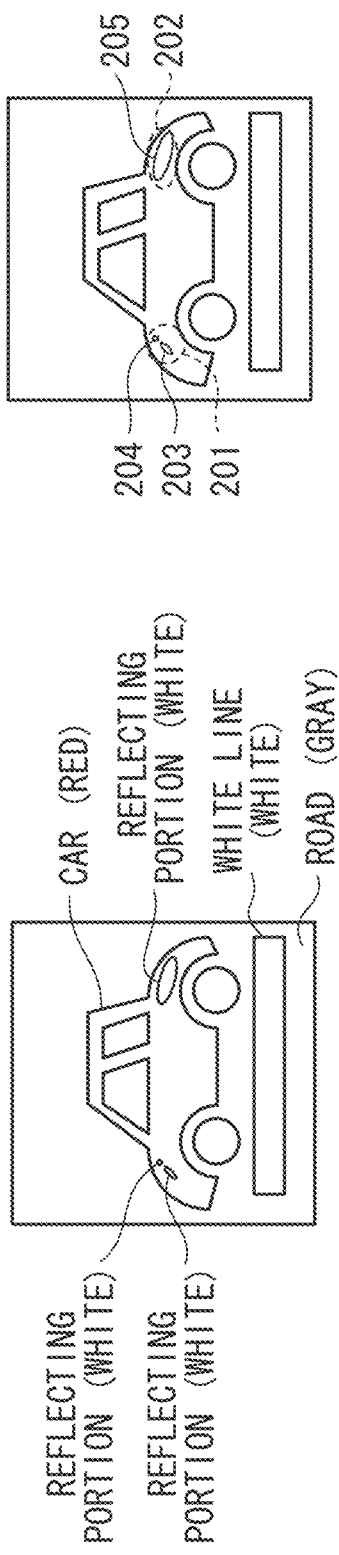
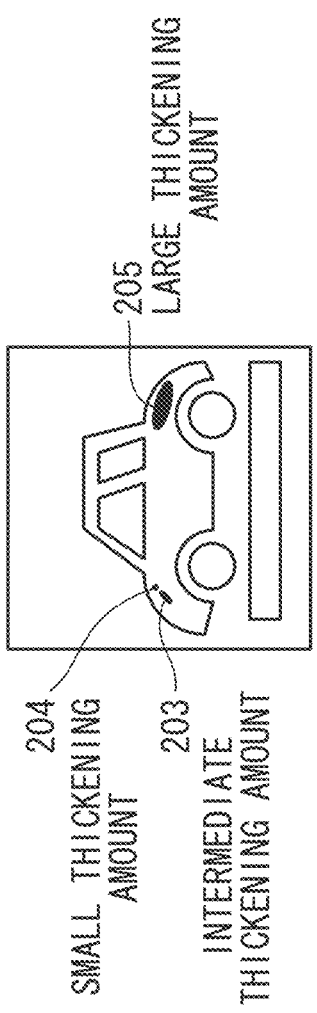
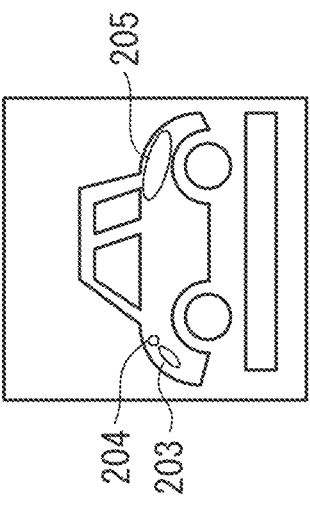

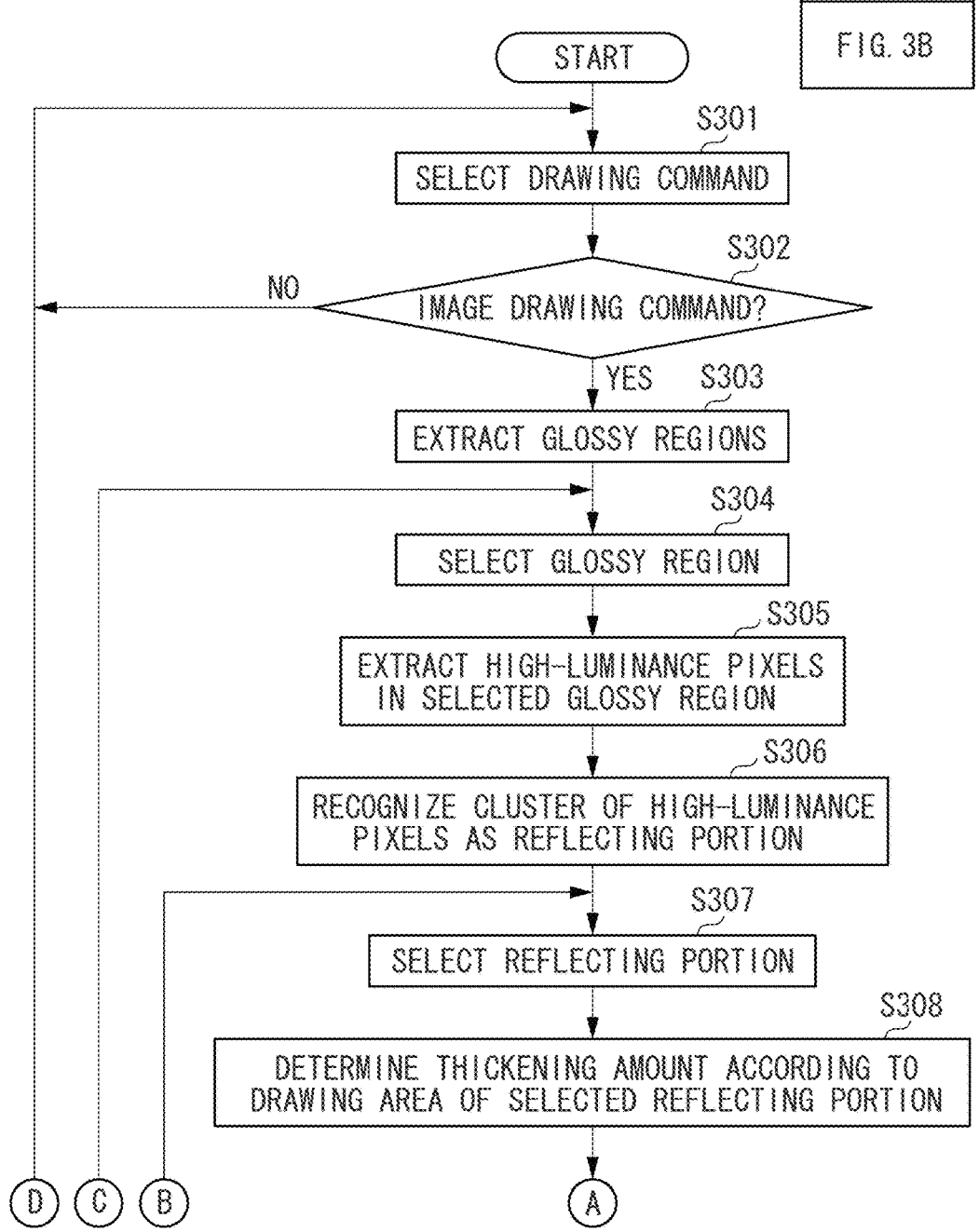

IMAGE PROCESSING APPARATUS TO EXTRACT LUMINANCE DATA FROM IMAGE DATA, METHOD FOR CONTROLLING THE SAME, AND STORAGE MEDIUM

BACKGROUND OF THE INVENTION

Field of the Invention

The present invention relates to an image processing apparatus, a method for controlling the image processing apparatus, and a storage medium.

Description of the Related Art

In recent years, there has been proposed a method for reproducing a texture such as glossiness when outputting image data. Japanese Patent Application Laid-Open No. 2015-79443 discusses a technique for emphasizing or deemphasizing a light reflecting portion in a photograph by generating a tone curve for increasing or decreasing pixel values of high-luminance pixels in an input image and applying the tone curve to the image data.

The above-described technique discussed in Japanese Patent Application Laid-Open No. 2015-79443 is processing for changing the values of high-luminance pixels. Accordingly, if the pixels of the reflecting portion in the input image have high luminance, the signal values of high-luminance pixels immediately become saturated, making it difficult to emphasize light reflection.

SUMMARY OF THE INVENTION

An image processing apparatus includes an extraction unit configured to extract a high-luminance region including a high-luminance pixel having a higher luminance than a predetermined luminance included in received image data, an expansion unit configured to expand the high-luminance region by setting pixel values of pixels configuring a surrounding region of the high-luminance region determined based on an area of the high-luminance region to the same pixel value as the high-luminance pixel, and an output unit configured to output image data having the expanded high-luminance region.

Further features of the present invention will become apparent from the following description of example embodiments with reference to the attached drawings.

BRIEF DESCRIPTION OF THE DRAWINGS

FIGS. 2A, 2B, 2C, and 2D are views illustrating processing of a glossiness control unit according to an example embodiment.

DESCRIPTION OF THE EMBODIMENTS

Various example embodiments of the present invention will be described in detail below with reference to the accompanying drawings. The following example embodiments limit neither the present invention nor the ambit of the appended claims. Not all of the combinations of the features described in the present example embodiment are indispensable to the solutions for the present invention.

According to the example embodiment, a signal value of a high-luminance pixel in an input image is increased and, at the same time, the high-luminance pixel is thickened. Thus, even if the signal value of the high-luminance pixel in the input image is originally high, processing for emphasizing a reflecting portion in a photograph is achieved.

Figure 1A:
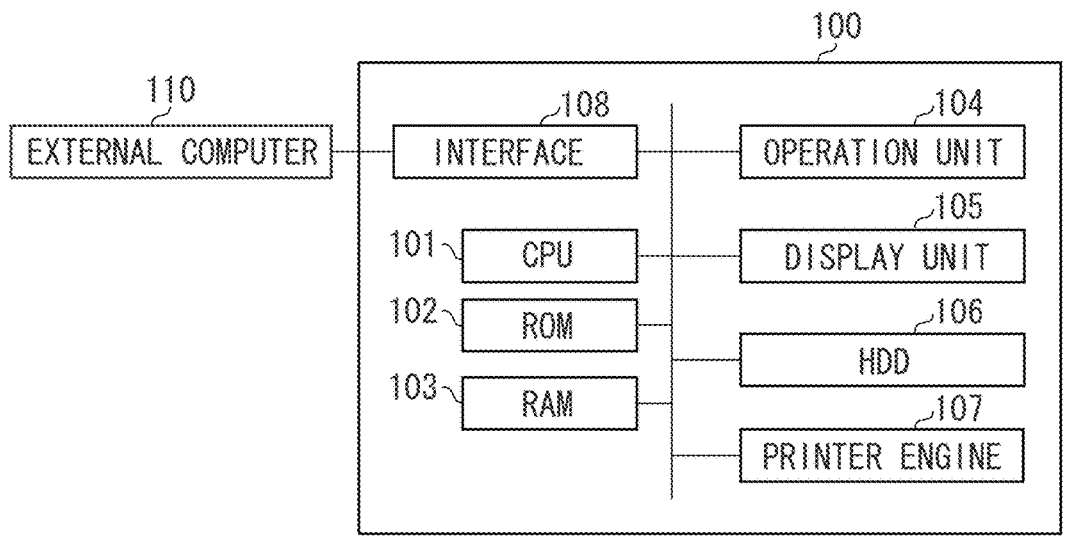
FIGS. 1A and 1B are block diagrams each illustrating an image processing apparatus according to an example embodiment.

FIG. 1A is a block diagram illustrating a hardware configuration of an image processing apparatus 100 according to an example embodiment of the present invention.

The image processing apparatus 100 is connected with an external computer 110 via a network. A central processing unit (CPU) 101 functions as a control unit for controlling operations of the image processing apparatus 100. The CPU 101 executes a boot program stored in a read only memory (ROM) 102. Then, the CPU 101 loads an operating system (OS) or programs stored in a hard disk drive (HDD) 106 into a random access memory (RAM) 103 and then executes the OS and programs to perform various control (described below). An operation unit 104 is provided with keys operated by a user or a light emitting diode (LED). A display unit 105 displays a message to the user or an input image. As the display unit 105 is provided with a touch panel, the display unit 105 can also function as an operation unit. The HDD 106 stores received image data, processing target image data, and processed image data. Under control of the CPU 101, a printer engine 107 prints an image on a sheet based on image data.

Figure 1B:
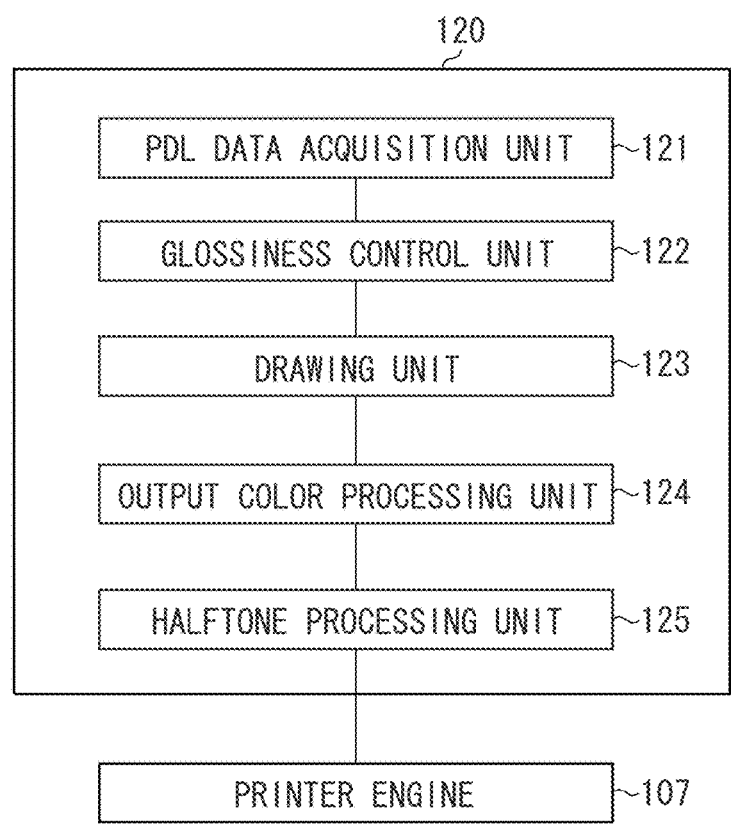

FIG. 1B is a block diagram illustrating functions of the image processing apparatus 100 according to an example embodiment. Although, in the description of the present example embodiment, these functions are implemented when the CPU 101 loads the OS or programs stored in the HDD 106 into the RAM 103 and then executes the OS or programs, these functions may also be implemented by an application specific integrated circuit (ASIC).

Functions of the control unit 120 implemented when the CPU 101 executes a program include a page description language (PDL) data acquisition unit 121, a glossiness control unit 122, a drawing unit 123, an output color processing unit 124, and a halftone processing unit 125.

Each function will be described in detail below.

The PDL data acquisition unit 121 receives PDL data from the external computer 110 and outputs the PDL data to the glossiness control unit 122. The PDL data includes a plurality of drawing commands. The PDL data includes, for example, a text drawing command, a graphics drawing command, and an image drawing command. The image drawing command includes, for example, input image data, an input image size, a drawing position, and a drawing size. In the input image data, each pixel is composed of a red, green, and blue (RGB) 8-bit color elements. For example, the RGB values R=G=B=0 produce black, and the RGB values R=G=B=255 produce white.

The glossiness control unit 122 receives PDL data from the PDL data acquisition unit 121, performs glossiness control processing on the input image data of the image drawing command in the PDL data, and outputs the PDL data including the processed image data to the drawing unit 123. The glossiness control unit 122 increases a signal value of a high-luminance pixel in the input image data and, at the same time, thickens the high-luminance pixel to improve the glossiness.

The drawing unit 123 generates a drawing image (in this case, an RGB image) based on the PDL data received from the glossiness control unit 122, and outputs the generated drawing image to the output color processing unit 124. When processing the image drawing command, the drawing unit 123 enlarges or reduces the input image data using an input image size and a drawing size, and performs processing for drawing the enlarged or reduced image data at a drawing position.

The output color processing unit 124 receives the RGB image from the drawing unit 123, performs color conversion processing on the RGB image to generate a cyan, magenta, yellow, and black (CMYK) image, and outputs the CMYK image to the halftone processing unit 125. The halftone processing unit 125 converts the multivalued CMYK image received from the output color processing unit 124 into a binary CMYK image as a latent image of color materials of the printer engine 107, and outputs the binary CMYK image to the printer engine 107. The printer engine 107 forms each color material on an output medium such as paper based on the binary CMYK image received from the halftone processing unit 125.

Processing of the glossiness control unit 122 according to an example embodiment will be described below.

FIGS. 2A to 2D are views illustrating processing of the glossiness control unit 122 according to an example embodiment.

FIG. 2A is a view illustrating a photograph of a red car running on a gray road with a white line as an example of the image drawing command included in the PDL data. In this image, three different white light-reflecting portions exist on a surface of the car. The following description will be made on the premise that the RGB color values of each reflecting portion include R=G=B=254.

FIG. 2B illustrates an example of extracting portions having glossiness (hereinafter referred to as glossy regions 201 and 202) from the image of the car through glossy region extraction processing. The glossy region extraction processing extracts a reflecting portion and its surrounding as a glossy portion. Like the glossy region 201, a plurality of reflecting portions 203 and 204 may exist in a glossy region. However, the glossy region extraction processing does not extract a surrounding portion of the white line on the gray road without glossiness as a glossy region even if the surrounding portion is a white region similar to the reflecting portion.

FIG. 2C illustrates an example of processing for detecting and thickening the reflecting portions (high-luminance regions) 203, 204, and 205 as pixels having a higher luminance in the glossy regions 201 and 202 extracted in the processing illustrated in FIG. 2B. The glossiness control unit 122 extracts reflecting portions included in the image data by detecting high-luminance pixels included in the glossy regions, and determines a thickening amount with which the reflecting portions are to be thickened according to an area of each reflecting portion. In this case, the glossiness control unit 122 determines a smaller thickening amount for a reflecting portion having a smaller area, and a larger thickening amount for a reflecting portion having a larger area. Then, the glossiness control unit 122 corrects the thickening amount using an enlargement rate in the drawing unit 123 acquired from the input image size and the drawing size based on the image drawing command.

FIG. 2D illustrates a state where the color values of each reflecting portion is changed from R=G=B=254 to R=G=B=255, and then each reflecting portion is thickened according to the determined thickening amount. Increasing the pixel values (increasing the luminance) of the reflecting portions 203, 204, and 205 only brings a slight difference between the reflecting portions and the other portions. However, because the pixel values are increased by expanding the reflecting portions, reflection of light seems to have become larger in size, i.e., the reflecting portions 203, 204, and 205 seem to be enlarged.

Figure 3B:
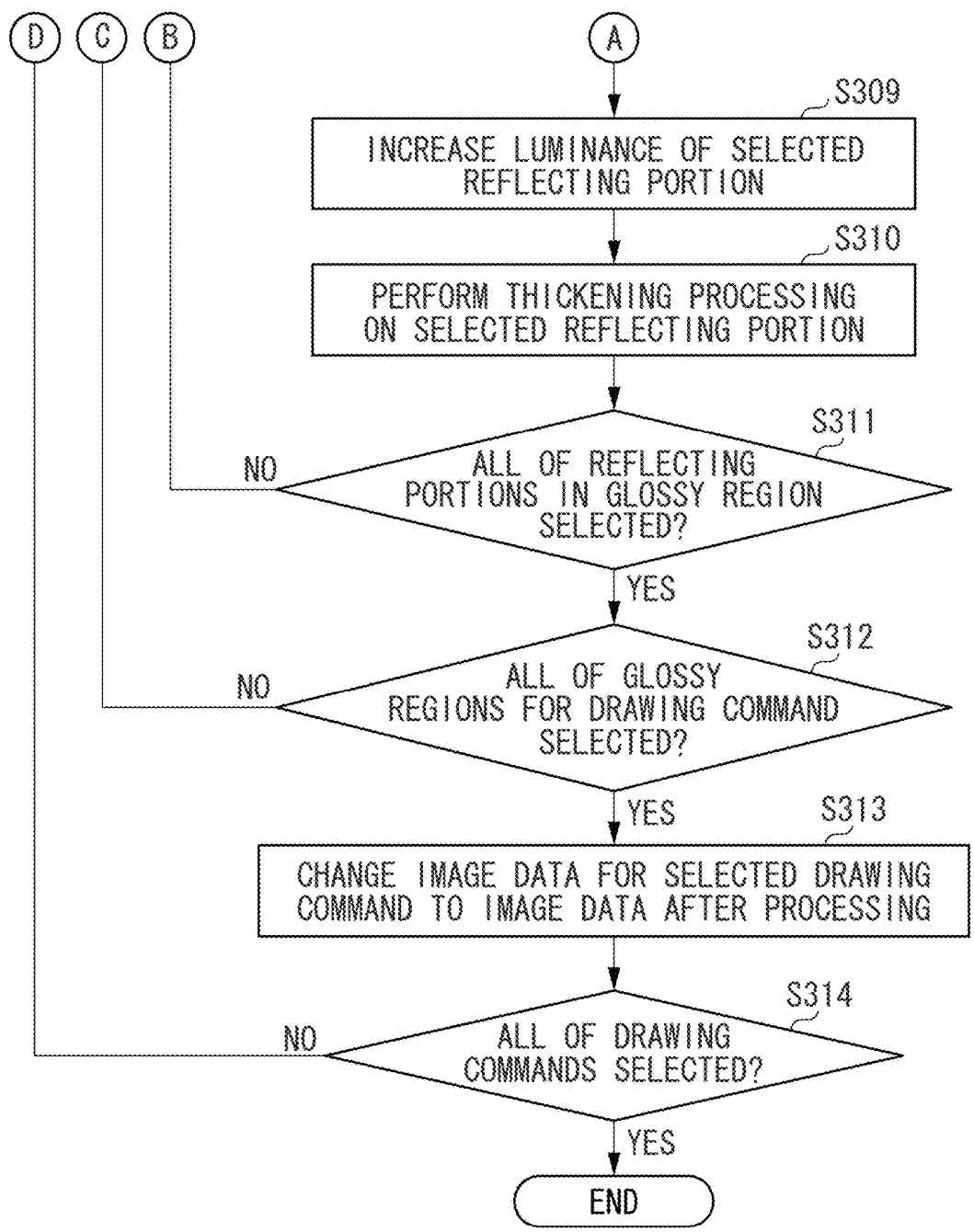
FIG. 3, composed of FIG. 3A and FIG. 3B, is a flowchart illustrating image processing performed by the image processing apparatus according to an example embodiment.

FIG. 3 is a flowchart illustrating image processing performed by the image processing apparatus 100 according to an example embodiment. This processing will be described below on the premise that the processing is implemented when the above-described CPU 101 loads a program stored in the HDD 106 into the RAM 103 and executes the program.

In step S301, the CPU 101 selects one of PDL data drawing commands received from the PDL data acquisition unit 121. In step S302, the CPU 101 determines whether the drawing command selected in step S301 is an image drawing command. When the selected command is an image drawing command (YES in step S302), the processing proceeds to step S303. On the other hand, when the selected command is not an image drawing command (NO in step S302), the processing returns to step S301. In step S303, the CPU 101 extracts glossy regions based on the image drawing command. As an example of a method for extracting glossy regions, the CPU 101 divides the image data into blocks or into a plurality of regions by using a region division technique, and determines whether each division region has glossiness. In a case where the CPU 101 determines that the division region has glossiness, the CPU 101 extracts the region having glossiness as a glossy region. On the other hand, in a case where the CPU 101 determines that the division region does not have glossiness, the CPU 101 determines that the region is a non-glossy region. As an example of a method for determining the presence or absence of glossiness, the CPU 101 may obtain skewness of a histogram to determine whether the skewness is equal to or larger than a threshold value.

In step S304, the CPU 101 selects one of the glossy regions extracted in step S303. In step S305, the CPU 101 extracts high-luminance pixels included in the glossy region selected in step S304. The following description will be made on the premise that at least one glossy region was extracted in step S303. When a plurality of glossy regions was extracted in step S303, the CPU 101 repeats the processing in steps S304 to S312 for the number of glossy regions. In this case, as an example of a method for extracting high-luminance pixels in step S305, the CPU 101 may extract the pixels in which the average value of the RGB values is equal to or larger than "240". In step S306, the CPU 101 extracts a cluster of high-luminance pixels and recognizes the cluster as one reflecting portion. The following description will be made on the premise that at least one reflecting portion was detected in step S306. When a plurality of reflecting portions was detected in step S306, the CPU 101 repeats the processing in steps S307 to S311 for the number of reflecting portions.

In step S307, the CPU 101 selects one of the reflecting portions detected in step S306. In step S308, the CPU 101 obtains an area of the selected reflecting portion and determines a thickening amount of the reflecting portion.

Figure 4A:
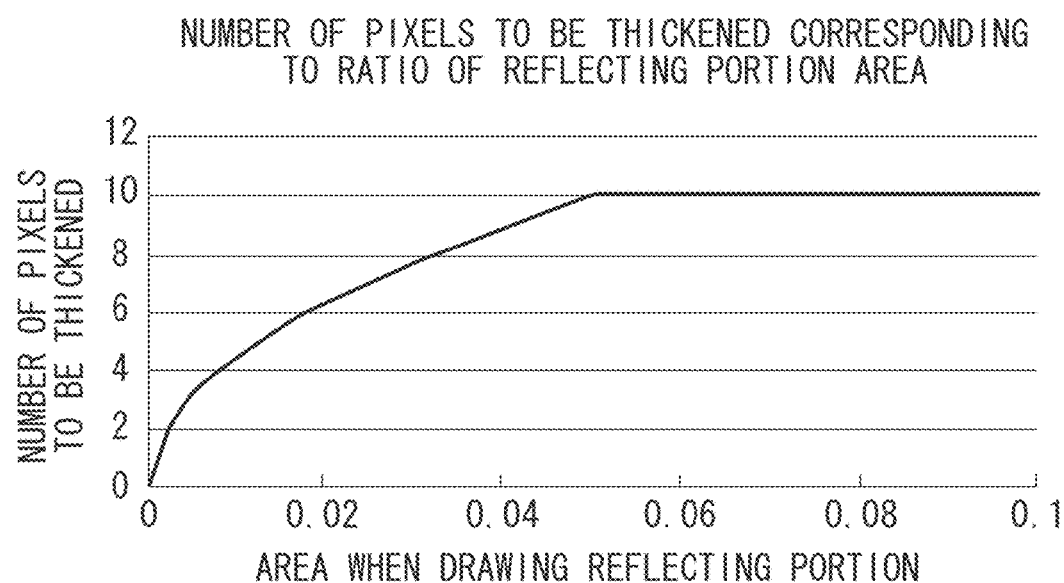
FIG. 4A is a graph illustrating a relation between an area of a reflecting portion at the time of drawing and its corresponding number of pixels to be thickened according to an example embodiment.

FIG. 4A is a graph illustrating a relation between an area of the reflecting portion at the time of drawing and the number of pixels to be thickened corresponding to the area of the reflecting portion according to an example embodiment.

Referring to FIG. 4A, a horizontal axis denotes an area of the selected reflecting portion multiplied by an enlargement rate at the time of drawing (an area of the reflecting portion at the time of drawing), and a vertical axis denotes the number of pixels to be thickened. Referring to FIG. 4A, a larger thickening amount is determined for the larger area of the reflecting portion at the time of drawing, and a smaller thickening amount is determined for the smaller area of the reflecting portion at the time of drawing.

In step S309, the CPU 101 performs processing for increasing the luminance of pixels included in the reflecting portion selected in step S307.

Figure 4B:
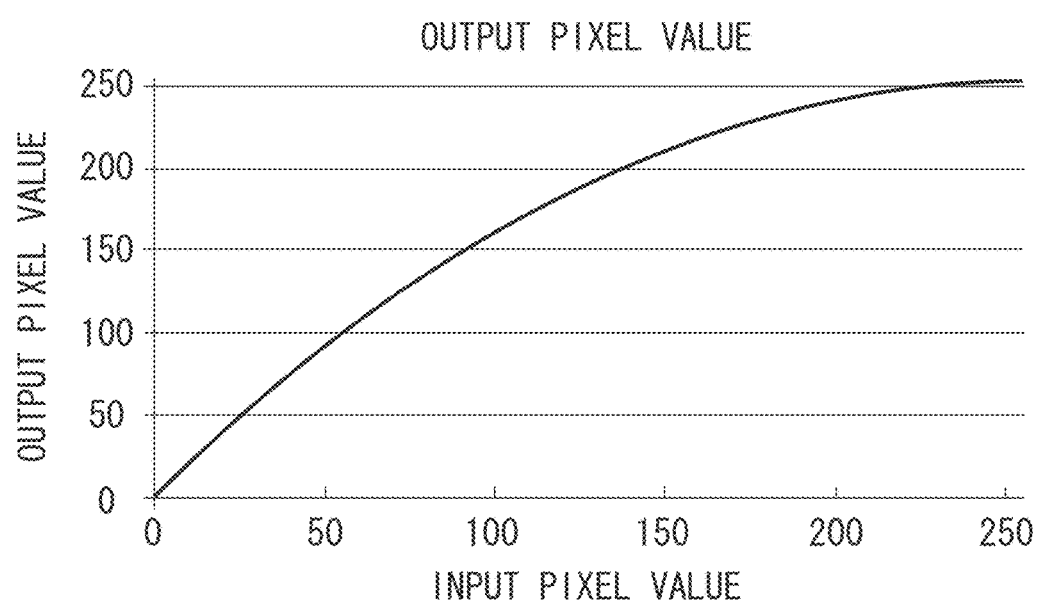
FIG. 4B is a graph illustrating an example of a one-dimensional lookup table (1DLUT) for performing processing for increasing luminance of pixels.

FIG. 4B is a graph illustrating an example of a one-dimensional lookup table (1DLUT) for performing the processing for increasing the luminance of pixels. Referring to FIG. 4B, a horizontal axis denotes a pixel value of input image data, and a vertical axis denotes an output pixel value as a result of increasing the luminance. According to the example embodiment, the processing for increasing the luminance of pixels is applied to each of the RGB color elements.

In step S310, the CPU 101 performs processing for thickening the selected reflecting portion. The thickening processing will be described in detail below with reference to FIGS. 5A to 5G. In step S311, the CPU 101 determines whether all of the reflecting portions of the selected glossy region have been selected and processed. In a case where not all of the reflecting portions have been selected and processed (NO in step S311), the processing returns to step S307. In step S307, the CPU 101 selects the next reflecting portion and performs the above-described processing. On the other hand, in a case where all of the reflecting portions have been selected and processed (YES in step S311), the processing proceeds to step S312. In step S312, the CPU 101 determines whether all of the glossy regions in the input image for the selected drawing command have been selected and processed. In a case where not all of the glossy regions have been selected and processed (NO in step S312), the processing returns to step S304. In step S304, the CPU 101 selects the next glossy region and performs the above-described processing. On the other hand, in a case where all of the glossy regions have been selected and processed (YES in step S312), the processing proceeds to step S313. In step S313, the CPU 101 changes the input image data to image data after processing, and the processing proceeds to step S314. In step S314, the CPU 101 determines whether all of the drawing commands have been processed. In a case where not all of the drawing commands have been processed (NO in step S314), the processing returns to step S301. In step S301, the CPU 101 receives an unselected drawing command. On the other hand, in a case where all of the drawing commands have been processed (YES in step S314), the processing ends this flowchart.

The above-described processing performed by the glossiness control unit 122 will be described in detail below with reference to FIGS. 5A to 5G. In the processing for thickening the selected reflecting portion in step S310, the CPU 101 performs processing for thickening the reflecting portion while generating pixels of neutral colors for the surrounding pixels to avoid an unnatural result of processing.

FIGS. 5A to 5G are views illustrating processing on image data of a reflecting portion performed by the image processing apparatus 100 according to an example embodiment.

Figure 5A:
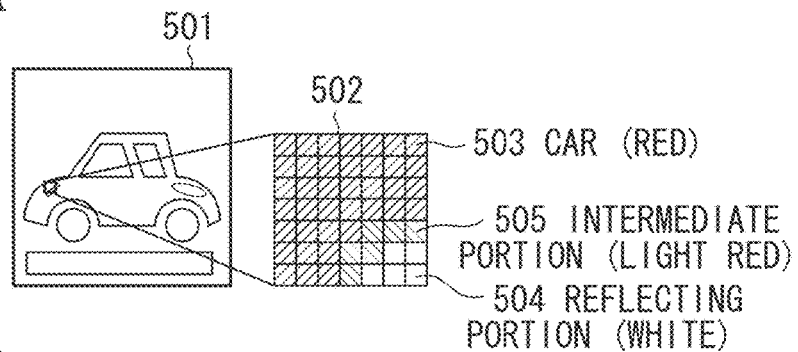
FIGS. 5A, 5B, 5C, 5D, 5E, 5F, and 5G are views illustrating processing on image data of a reflecting portion performed by the image processing apparatus according to an example embodiment.

An image 501 illustrated in FIG. 5A is the same as the example of an input image of an image drawing command of PDL data illustrated in FIG. 2A. A portion 502 illustrated in FIG. 5A indicates an enlarged part of a reflecting portion of the car. The portion 502 includes a red portion 503 as the color of the car body, a white portion 504 in the reflecting portion, and an intermediate (light red) portion 505. It is assumed that the thickening amount is determined to be "3" in step S310 illustrated in FIG. 3 for the enlarged reflecting portion 504.

Figure 5B:
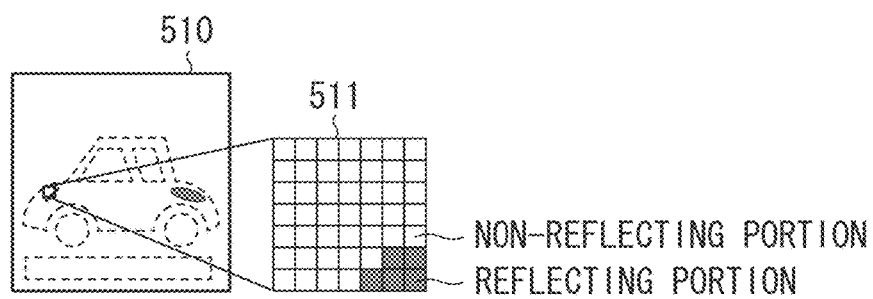

An image 510 illustrated in FIG. 5B represents the image 501 illustrated in FIG. 5A, in which the pixels of the reflecting portion are emphasized. The black portion indicates the pixels of the reflecting portion and the white portion indicates the pixels of the non-reflecting portion. In the image 510, the car and white line in the image 501 are drawn by dotted lines to make it easier to recognize the position of the reflecting portion that does not actually exist. The intermediate portion has a low luminance and therefore is a non-reflecting portion. The image 511 illustrated in FIG. 5B represents the right-hand portion 502 illustrated in FIG. 5A, in which the pixels are grouped into the reflecting portion and the non-reflecting portion.

Figure 5C:
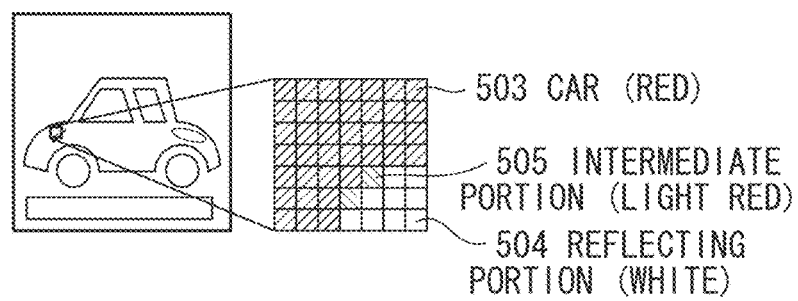

FIG. 5C illustrates an image as a result of vertically and horizontally thickening (expanding) the pixels of the reflecting portion 504 in the image 501 illustrated in FIG. 5A by one pixel toward the pixels of the non-reflecting portion as a surrounding region of the reflecting portion 504. Although, referring to FIG. 5C, the result of thickening the reflecting portion 504 in upward and leftward directions can be confirmed, the reflecting portion 504 is also thickened in the downward and rightward directions.

Figure 5D:
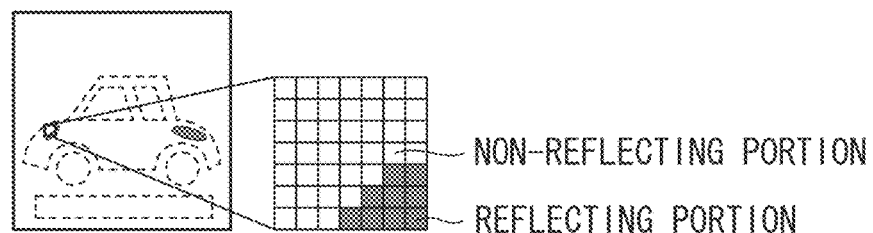

Likewise, FIG. 5D illustrates an image as a result of vertically and horizontally thickening the pixels of the reflecting portion in the image 511 illustrated in FIG. 5B by one pixel.

Figure 5E:
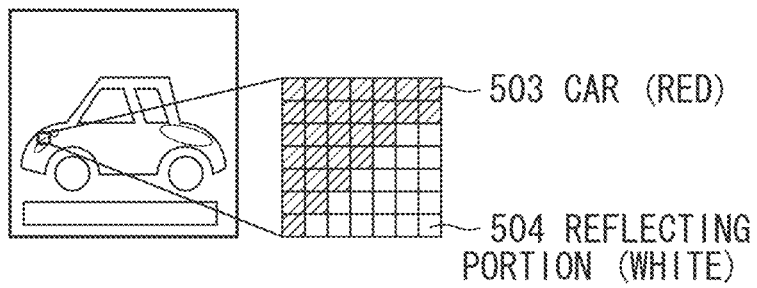
Figure 5F:
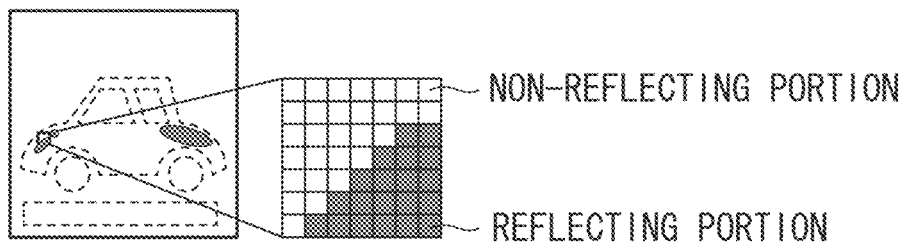

FIGS. 5E and 5F illustrate images as a result of repeating such a thickening operation three times (a thickening amount of 3).

It is understood that performing the processing for thickening by one pixel in this way a predetermined number of times enables thickening the reflecting portion with a predetermined thickening amount. However, in the image 502 illustrated in FIG. 5A as an image before the thickening processing, the intermediate portion 505 of light red exists between the reflecting portion 504 and the red portion 503 of the car. In the image 502 illustrated in FIG. 5E as an image after the thickening processing, the intermediate portion 505 does not exist. Accordingly, the reflecting portion 504 may seem to be floating above the car.

Figure 5G:
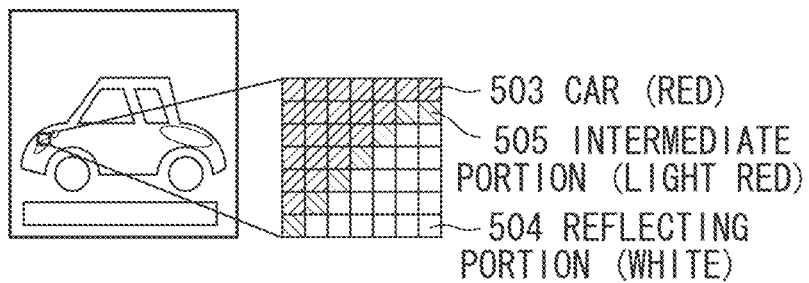

As illustrated in FIG. 5G, the CPU 101 performs again the processing for thickening the reflecting portion 504 by one pixel on the image 502 illustrated in FIG. 5E. In the thickening processing, the CPU 101 calculates an average value of the colors of the pixels of the original non-reflecting portion (the red portion 503 of the car body) and the pixels of the thickened reflecting portion 504, and applies the average value to the intermediate portion 505.

This enable performing the processing for thickening the reflecting portion 504 while blending the result of thickening the reflecting portion 504 into the surrounding pixels so that the result does not seem unnatural.

As described above, according to the example embodiment, the luminance of the pixels of the high-luminance image portion in the input image is increased and, at the same time, the high-luminance image portion is thickened. Thus, the high-luminance image portion, i.e., the reflecting portion, included in the input image can be emphasized.

As another example of a method for extracting high-luminance pixels in step S305 illustrated in FIG. 3, the CPU 101 may extract pixels having 90% or more of the largest luminance value of the pixels of the selected glossy region. The color of the reflecting portion may not be white depending on an object or a light source captured in the image. In that case, the CPU 101 may determine whether each pixel is a high-luminance pixel by performing the following determination for each pixel.

More specifically, the CPU 101 may extract a high-luminance pixel based on a condition that, out of the RGB value of each pixel, the signal value of an element having the largest (brightest) signal value is TH1 or larger, the signal value of an element having the second largest signal value is TH2 or larger, and the signal value of an element having the third largest (smallest) signal value is TH3 or larger. In this case, TH1=240, TH2=200, and TH3=150 can be considered as examples of TH1, TH2, and TH3, respectively.

Although, in the present example embodiment, the CPU 101 performs the processing for increasing the luminance of a selected reflecting portion in step S309 illustrated in FIG. 3, this processing may be omitted.

In a case where the CPU 101 was unable to sufficiently change the luminance of the reflecting portion in step S309 because of the high luminance value of the reflecting portion, the CPU 101 may perform the processing for thickening the reflecting portion in step S310 to improve the glossiness of the reflecting portion.

Although, in the present example embodiment, the reflecting portion in the image was emphasized by thickening the reflecting portion, the CPU 101 may perform processing for reducing the glossiness by thinning the reflecting portion (by performing processing for thickening the non-reflecting portion relative to the reflecting portion).

In a case where the drawing unit 123 according to the example embodiment is able to draw an image with a plurality of drawing resolutions (number of pixels drawn in one inch), the number of pixels to be thickened according to the drawing area of the reflecting portion in step S308 may be prepared for each drawing resolution. Further, the number of pixels according to the drawing area of the reflecting portion may be prepared according to each strength of processing or a paper size.

According to the example embodiment, glossy regions are extracted by the glossiness control unit 122. However, instead of performing this processing, the CPU 101 may extract high-luminance pixels to extract a reflecting portion. In this case, for example, the white line in the image illustrated in FIG. 2A might be erroneously determined as a reflecting portion. A minute cluster of high-luminance pixels might be generated by image compression noise. Therefore, erroneous determination can be reduced by excluding such cluster of high-luminance pixels having a size equal to or smaller than a predetermined size or a size equal to or larger than a predetermined size from the reflecting portion. Erroneous determination can be further reduced by excluding pixels in the vicinity of excluded cluster of high-luminance pixels from the reflecting portion.

Example embodiments of the present invention are not limited to a printer. The glossiness control processing can be performed at the time of data conversion in an output device such as a display and a projector, an input device such as a camera and a scanner, or a computer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-152290, filed Aug. 2, 2016, which is hereby incorporated by reference herein in its entirety.

What is claimed is:
1. An image processing apparatus comprising:
 a dividing unit configured to divide image data into a plurality of regions;
 a detecting unit configured to detect a presence or an absence of glossiness for each region to extract a glossy region;
 an extraction unit configured to extract, based on each area of high-luminance regions included in image data, at least one high-luminance region containing a high-luminance pixel having a higher luminance than a predetermined luminance included in the glossy region; and
 an expansion unit configured to expand the at least one high-luminance region which is extracted by the extracting unit without expanding at least one high-luminance region which is not extracted by the extracting unit,
 wherein the expansion unit expands the high-luminance region in accordance with an expansion amount corresponding to at least an area of the high-luminance region, and wherein the extraction unit and the expansion unit are implemented by at least one processor or at least one circuit.

2. The image processing apparatus according to claim 1, wherein, in a case where a largest value, a second largest value, and a smallest value of RGB values of a pixel in the image data are equal to or larger than respectively different predetermined threshold values, the extraction unit extracts the pixel as the high-luminance pixel.

3. The image processing apparatus according to claim 1, wherein the extraction unit extracts as the high-luminance region a region including a pixel having a luminance equal to or larger than a predetermined ratio of a largest luminance value of pixels included in the glossy region.

4. The image processing apparatus according to claim 1, wherein the expansion unit performs processing for expanding the high-luminance region a predetermined number of times.

5. The image processing apparatus according to claim 4, wherein the expansion unit sets a pixel value of a region expanded last in the processing for expanding the high-luminance region to an average value of the pixel value before expansion and a pixel value of the high-luminance region.

6. The image processing apparatus according to claim 1, wherein the expansion unit expands the high-luminance region having a larger area with a larger expansion amount.

7. The image processing apparatus according to claim 1, wherein the expansion unit changes an amount of expanding the high-luminance region according to a resolution of the high-luminance region.

8. The image processing apparatus according to claim 1, wherein the high-luminance region is a reflecting portion included in the image data.

9. The image processing apparatus according to claim 1, wherein the at least one high-luminance region is expanded by setting pixel values of pixels configuring a surrounding region of the high-luminance region determined by the determining unit to the same pixel value as the high-luminance pixel.

10. The image processing apparatus according to claim 1, further comprising:
a printing unit configured to perform printing based on image data having the expanded high-luminance region.

11. A control method for controlling an image processing apparatus, the control method comprising:
dividing image data into a plurality of regions;
detecting a presence or an absence of glossiness for each region to extract a glossy region;
extracting, based on each area of high-luminance regions included in image data, at least one high-luminance region containing a high-luminance pixel having a higher luminance than a predetermined luminance included in the glossy region; and
expanding the at least one high-luminance region which is extracted without expanding at least one high-luminance region which is not extracted,
wherein the high-luminance region is expanded in accordance with an expansion amount corresponding to at least an area of the high-luminance region, and
wherein the extracting and the expanding are implemented by at least one processor or at least one circuit.

12. A non-transitory computer-readable storage medium storing computer-executable instructions that when executed by a computer cause the computer to execute a control method, the control method comprising:
dividing image data into a plurality of regions;
detecting a presence or an absence of glossiness for each region to extract a glossy region;
extracting, based on each area of high-luminance regions included in image data, at least one high-luminance region containing a high-luminance pixel having a higher luminance than a predetermined luminance included in the glossy region; and
expanding the at least one high-luminance region which is extracted without expanding at least one high-luminance region which is not extracted,
wherein the high-luminance region is expanded in accordance with an expansion amount corresponding to at least an area of the high-luminance region, and
wherein the extracting and the expanding are implemented by at least one processor or at least one circuit.

* * * * *